(12) United States Patent
Elias

(10) Patent No.: US 11,269,153 B2
(45) Date of Patent: Mar. 8, 2022

(54) CAMERA FILTER TRAY

(71) Applicant: James Elias, Rosenheim (DE)

(72) Inventor: James Elias, Rosenheim (DE)

(73) Assignee: Andrew Subratie, Surrey (GB)

( * ) Notice: Subject to any disclaimer, the term of this patent is extended or adjusted under 35 U.S.C. 154(b) by 0 days.

(21) Appl. No.: 15/406,687

(22) Filed: Jan. 14, 2017

(65) Prior Publication Data
US 2017/0205599 A1    Jul. 20, 2017

(30) Foreign Application Priority Data

Jan. 15, 2016 (GB) .................... 1600821

(51) Int. Cl.
*G02B 7/00* (2021.01)
*G03B 17/56* (2021.01)
*G03B 11/00* (2021.01)

(52) U.S. Cl.
CPC ........... *G02B 7/006* (2013.01); *G03B 17/565* (2013.01); *G03B 17/566* (2013.01); *G03B 11/00* (2013.01)

(58) Field of Classification Search
CPC .... G03B 11/00; G03B 17/565; G03B 17/566; G03B 17/12; G03B 17/568; F16B 2/10; F16B 2/12; F16B 2/14; F16M 11/041; F16M 13/00; F16M 2200/02; H04N 5/2254; H05K 5/0204; G02B 7/00; G02B 7/003; G02B 7/006; G02B 7/026; G02B 23/16; F16L 32/10; F16L 32/12; F16L 32/14
USPC ................ 359/892, 611, 811, 818, 827, 889; 24/488–521; 248/187.1, 316.1, 316.4, 248/316.6
See application file for complete search history.

(56) References Cited

U.S. PATENT DOCUMENTS

| | | | | |
|---|---|---|---|---|
| 3,270,994 A * | 9/1966 | Machan | ............... | F16M 13/022 24/505 |
| 4,050,791 A * | 9/1977 | Watanabe | ............. | G02B 7/006 359/892 |
| 4,384,767 A * | 5/1983 | Kawai | .................. | G03B 11/045 359/611 |
| 4,536,057 A * | 8/1985 | Sumi | .................... | G02B 26/007 359/827 |
| 4,712,897 A * | 12/1987 | Crema | .................. | G02B 23/16 359/823 |
| 4,938,489 A * | 7/1990 | Nemirovsky | ....... | B23B 31/1261 269/156 |

(Continued)

FOREIGN PATENT DOCUMENTS

| | | | | |
|---|---|---|---|---|
| CN | 203825345 U | * | 9/2014 | |
| EP | 0311358 A2 | * | 4/1989 | ............. G03B 11/00 |
| EP | 1847872 A1 | * | 10/2007 | ........... G03B 11/045 |

OTHER PUBLICATIONS

English machine translation of CN-203825345-U (Year: 2014).*
(Continued)

*Primary Examiner* — Nicholas R. Pasko
(74) *Attorney, Agent, or Firm* — Fay Sharpe LLP

(57) ABSTRACT

A retaining mechanism for removeably holding an optical filter in a frame, comprising a catch, and an actuator moveable in a first direction which acts on the catch to move the catch in a second direction, different from the first direction, from a first position capable of engaging with an optical filter in the frame to a second position incapable of engaging with the optical filter.

8 Claims, 8 Drawing Sheets

(56) References Cited

U.S. PATENT DOCUMENTS

| | | | | |
|---|---|---|---|---|
| 5,201,501 A * | 4/1993 | Fassler | ................... | B23Q 1/76 |
| | | | | 269/156 |
| 5,227,925 A * | 7/1993 | Eguchi | ................. | G02B 7/006 |
| | | | | 359/892 |
| 5,746,408 A * | 5/1998 | Theirl | .................... | H04N 5/65 |
| | | | | 248/295.11 |
| 6,525,890 B1 * | 2/2003 | Wang | ..................... | F21V 17/18 |
| | | | | 359/894 |
| 7,800,050 B2 * | 9/2010 | Onishi | .............. | G02B 17/0663 |
| | | | | 250/239 |
| 8,177,265 B2 * | 5/2012 | Stevens | ............. | E05B 47/0607 |
| | | | | 292/177 |
| 8,903,236 B2 * | 12/2014 | Subratie | ................ | G03B 11/00 |
| | | | | 396/544 |
| 9,285,659 B2 * | 3/2016 | Yokoyama | ........... | G03B 17/566 |
| 2015/0167707 A1 * | 6/2015 | Hyers | .................... | B25B 5/061 |
| | | | | 24/488 |

OTHER PUBLICATIONS

Bright Tangerine, "NAB 2016: Bright Tangerine Filter Trays," Vimeo, uploaded by Newsshooter, Apr. 25, 2016, https://www.vimeo.com/164104367. (Year: 2016).*

Bright Tangerine, "Bright Tangerine Gripper Tray," Vimeo, uploaded by Newsshooter, Oct. 5, 2016, https://www.vimeo.com/185737152. (Year: 2016).*

* cited by examiner

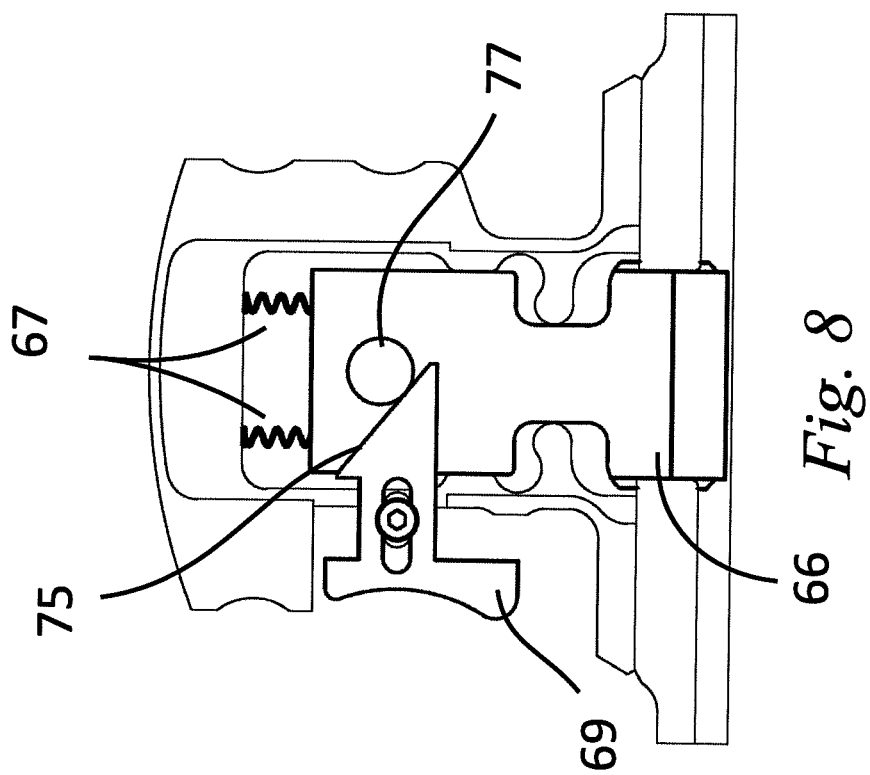
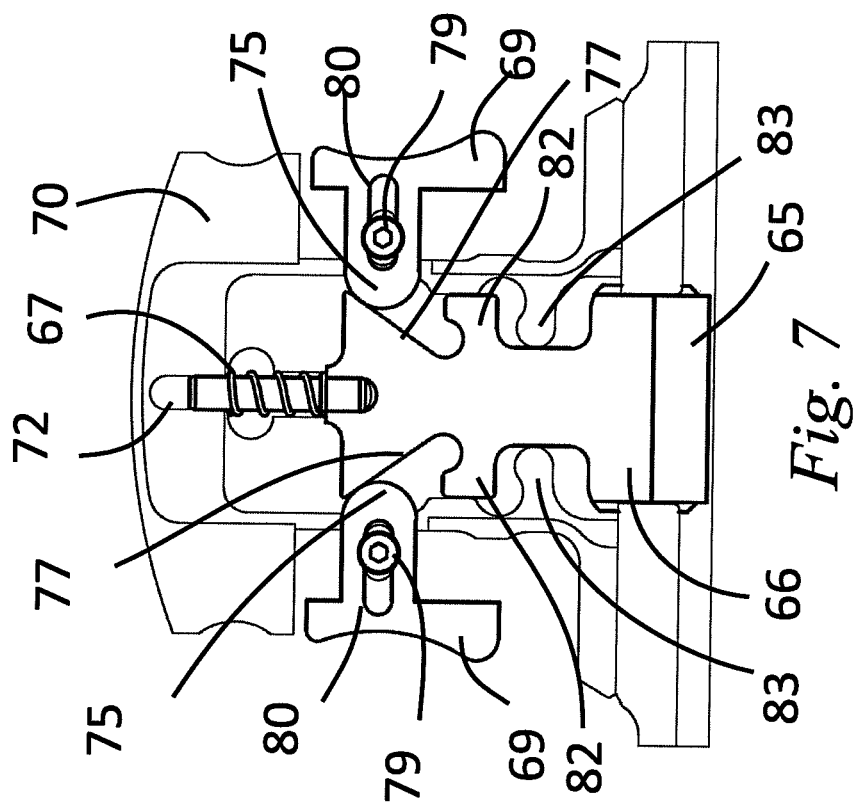

CAMERA FILTER TRAY

CROSS REFERENCE TO RELATED APPLICATIONS

This application claims priority to and the benefit of Great Britain Patent Application No. GB1600821.1, filed Jan. 15, 2016, the entirety of which is hereby incorporated by reference as if fully set forth herein.

The present specification relates to camera filter trays, that is, the trays that hold filters which slide in front of a camera lens usually housing in a matte box.

A known type of filter tray, common to several manufacturers, is shown in FIGS. 1 to 3. The filter tray 10 or holder body usually consists of a rectangular frame 12, and has inward protrusions in the form of wedges 14 around inner circumference of the rectangular frame 12. In addition to the wedges 14 shown, which are located substantially coplanar with the front surface 15, a continuous lip 17 is located around the inner circumference of the rectangular frame 12 substantially coplanar with the rear surface of the rectangular frame 12. A photographic filter 18 may then be placed in the frame so that it sits on the lip 17 of the rectangular frame 12, constrained by the wedges 14; the photographic filter 18 is slid downwards whilst slightly inclined so that the lower edge of the photographic filter 18 fits between the wedges 14 and the lip 17, before being pivoted about its lower edge to lie coplanar with the tray 10. A moveable wedge 20 is also provided that can be slid towards the centre of the rectangular frame 12 and retracted back away from the centre of the rectangular frame 12.

When the moveable wedge 20 is in the retracted positioned, a photographic filter 18 may be mounted on the rectangular frame 12, resting on the wedges provided on the underside of the rectangular frame 12, or conversely a photographic filter 18 may be dismounted. When the moveable wedge 20 is urged then inwardly, it abuts the edge of photographic filter 18 and in conjunction with the wedges 14 and lip 17 secures the photographic filter 18 in position in the tray 10.

The moveable wedge 20 is connected to an actuator knob 24, and inwardly biased by a spring 22 arranged coaxially with the actuator knob 24. In order to mount or dismount a photographic filter 18, the user grips the actuator knob 24 and pulls it upwards (that is, away from the rectangular frame 12), so that the moveable wedge 20 is drawn towards the rectangular frame 12 releasing the upper edge of the photographic filter 18. The photographic filter 18 now be mounted on the rectangular frame 12 by introducing the lower edge of the photographic filter 18 to the rectangular frame 12 while slightly tilted, and then allowed to lay flat before the actuator knob 24 is released, so that the spring 22 urges the moveable wedge 20 against the photographic filter 18 to constrain the photographic filter 18. Similarly, a photographic filter 18 is dismounted by reversing these steps.

A matte box usually includes sufficient space for a several trays 10, 10', 10", 10'" to be fitted in series. However, it is advantageous to limit the total length of a matte box, so the thickness of each tray is also limited. This means that the thickness of the actuator knob 24 cannot exceed the thickness of the tray 10 itself. The relatively small size of the actuator knob 24 can make it difficult to apply the necessary grip between a thumb and forefinger to overcome the bias of spring 22 to change a photographic filter 18 in the tray 10. This problem is exacerbated by filming in inhospitable environments, where the camera user may be wearing gloves.

The present invention aims to provide a filter tray arrangement that is convenient to use and which reduces these shortcomings.

According to the present invention, there is provided a filter tray according to the independent claims. This arrangement allows the filter tray thickness to be minimised, yet provides a convenient manner of releasing a photographic filter, most usually by pressing a button.

The invention will now be described, by way of example, with reference to the drawings, of which FIG. 1 is a perspective view of a known filter tray (with a portion cut away);

FIG. 7 is a sectional view of part of the new filter tray with actuators having a slot which engages with a pin to move linearly;

FIG. 8 is a sectional view of part of the new filter tray with a moveable wedge operated by a single actuator.

Figure 1:
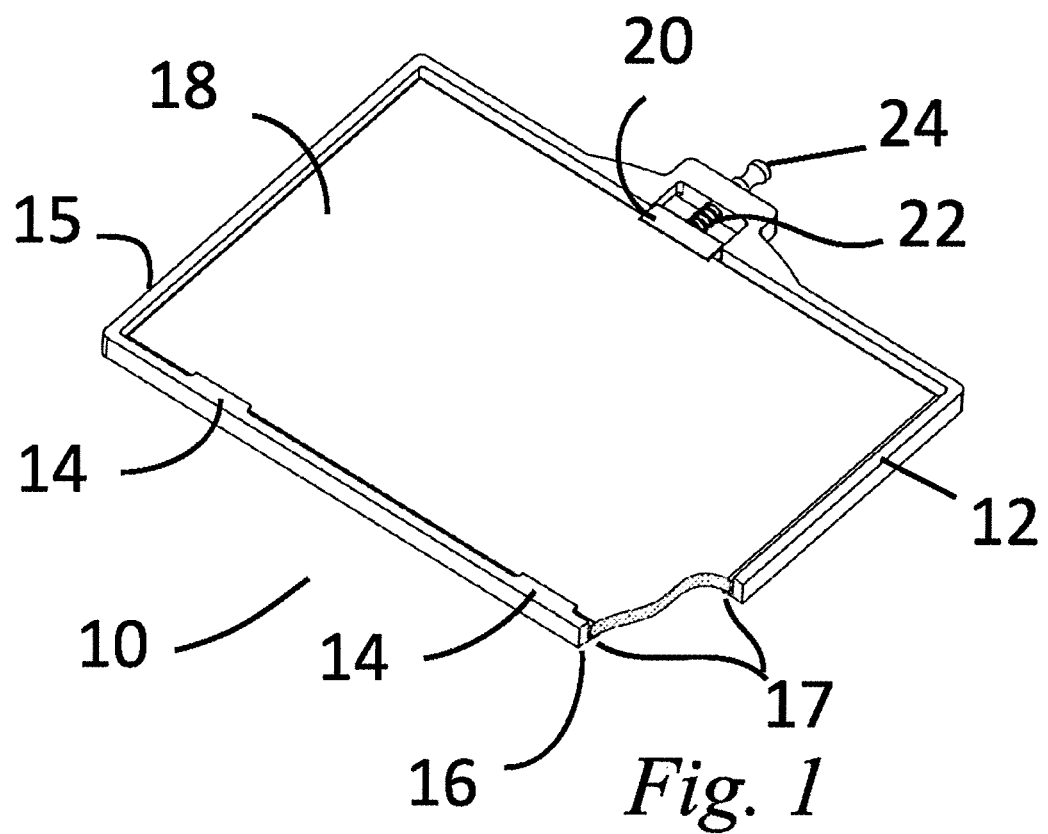
Figure 2:
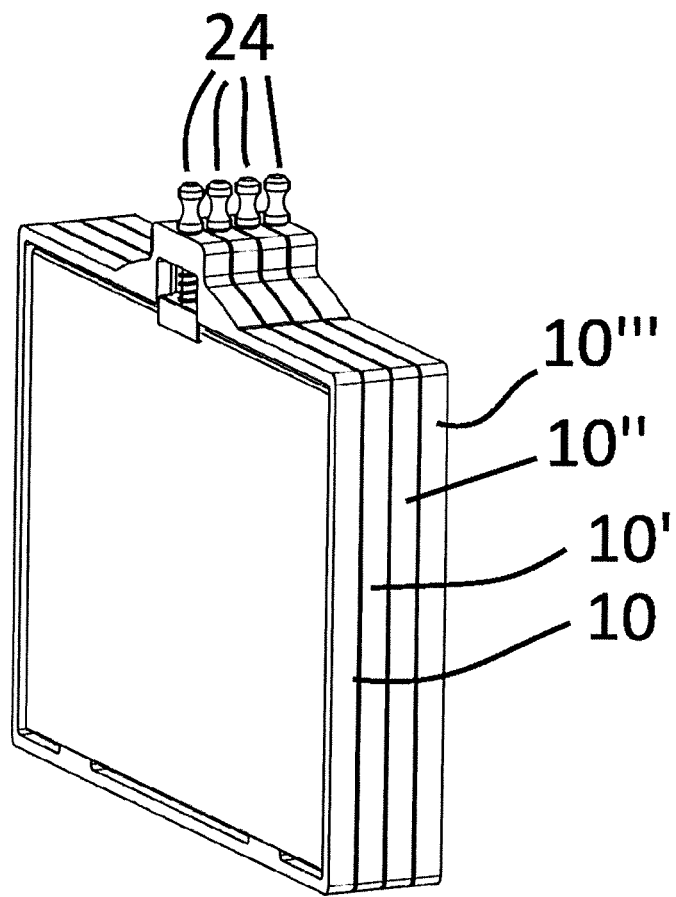
FIG. 2 is a perspective view of a several filter trays as positioned during use.
Figure 3:
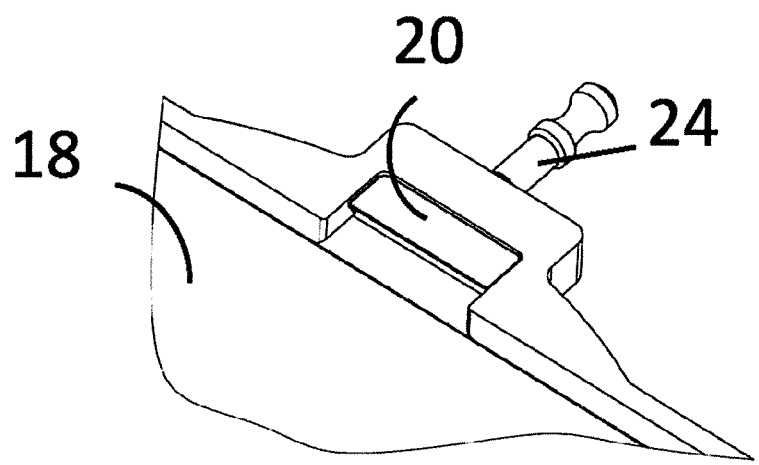
FIG. 3 is a perspective view of a detail of the known filter tray.
Figure 4:
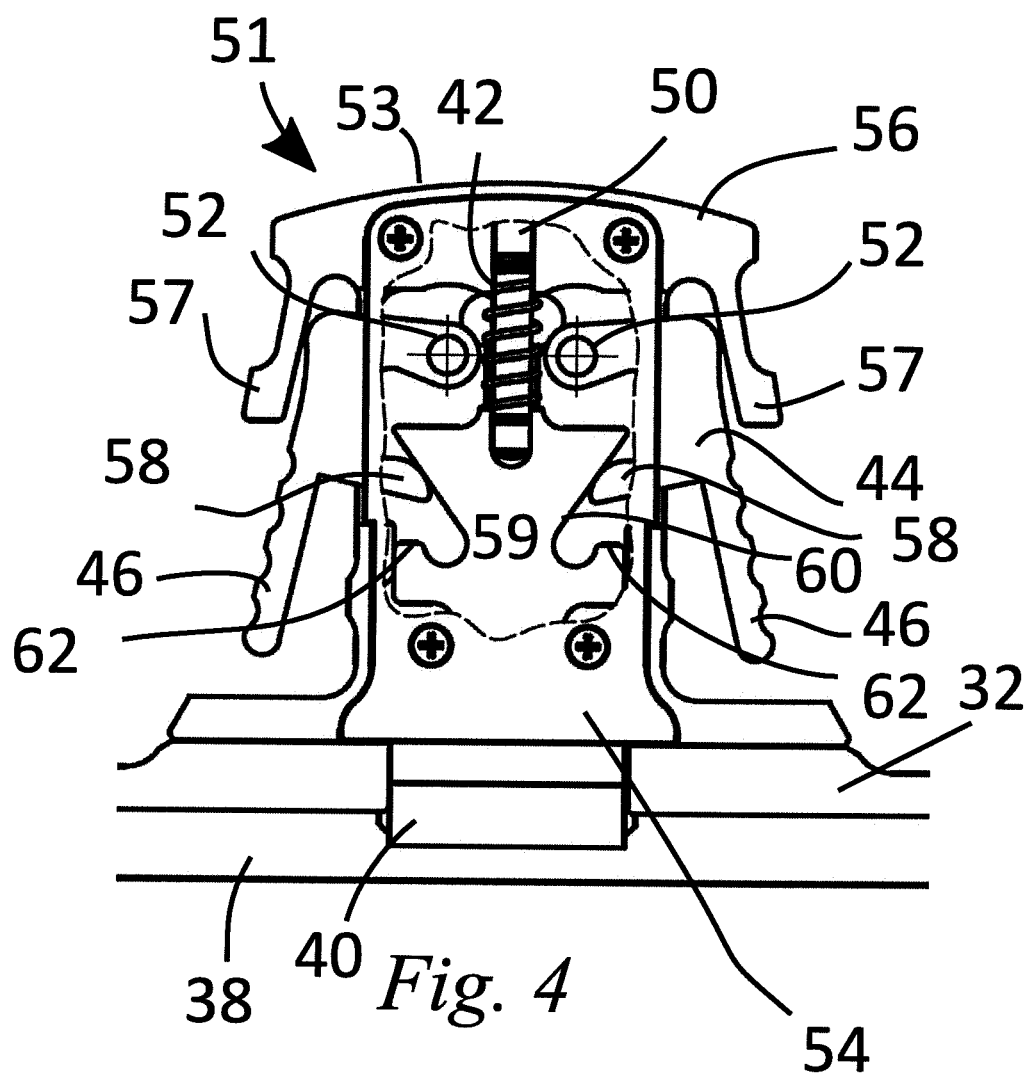
FIG. 4 is a sectional view of part of the new filter tray.

Referring to FIG. 4, a rectangular frame 32 of a tray 30 has a retainer actuator generally designated 51, which extends from the top of the rectangular frame 32 in a similar general manner to the actuator mechanism of known filter trays.

A wedge carrier body 59 is generally housed within a retainer body 53, enclosed on the front surface by a cover plate 54. The wedge carrier body 59 includes a sliding cam follower 60, which is generally triangular shaped, and shoulders 62, and of course the moveable wedge 40 itself which protrudes from the retainer body 53. The wedge carrier body 59 is biased downwards towards the photographic filter (not here shown) by a spring 42 mounted around a guide pin 50, which acts to urge the moveable wedge 40 downwards.

The retainer actuator 51 also includes two actuators 44, which are similar but oppositely disposed. Each actuator 44 engages with the retainer body 53 through a pivot boss 52 which allows the actuator 44 to pivot. Each actuator 44 includes an elongate arm 46 which extends substantially away from the pivot boss 52. Each actuator 44 also includes a levered cam surface 58, which bears against the sliding cam follower 60.

Figure 5:
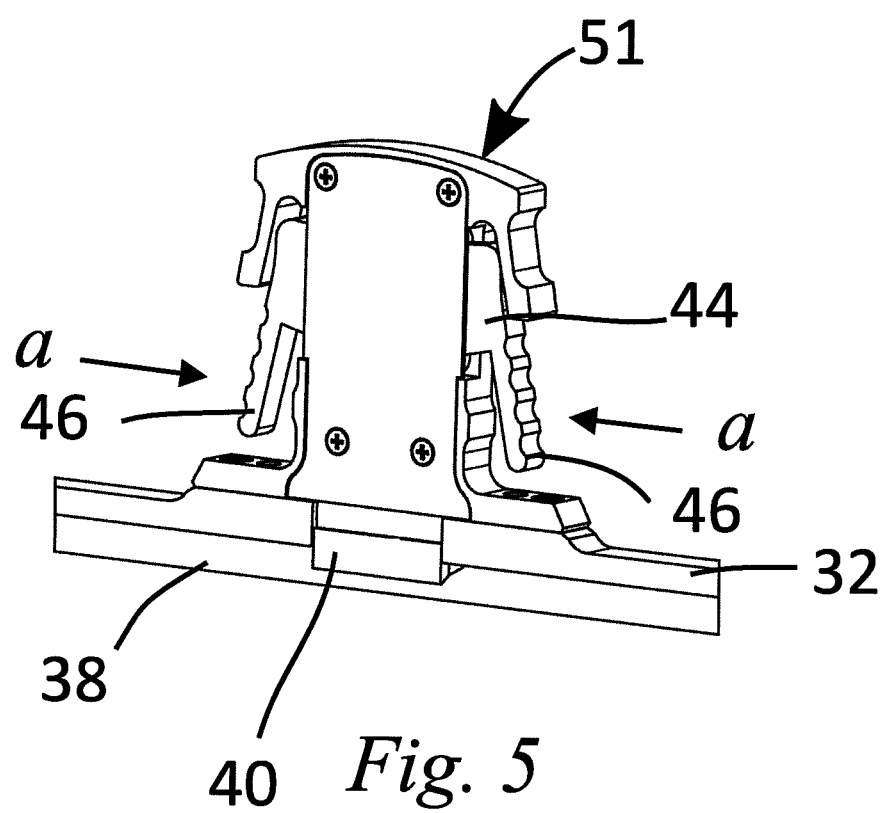
FIG. 5 is a perspective view of part of the new filter tray in a first position.
Figure 6:
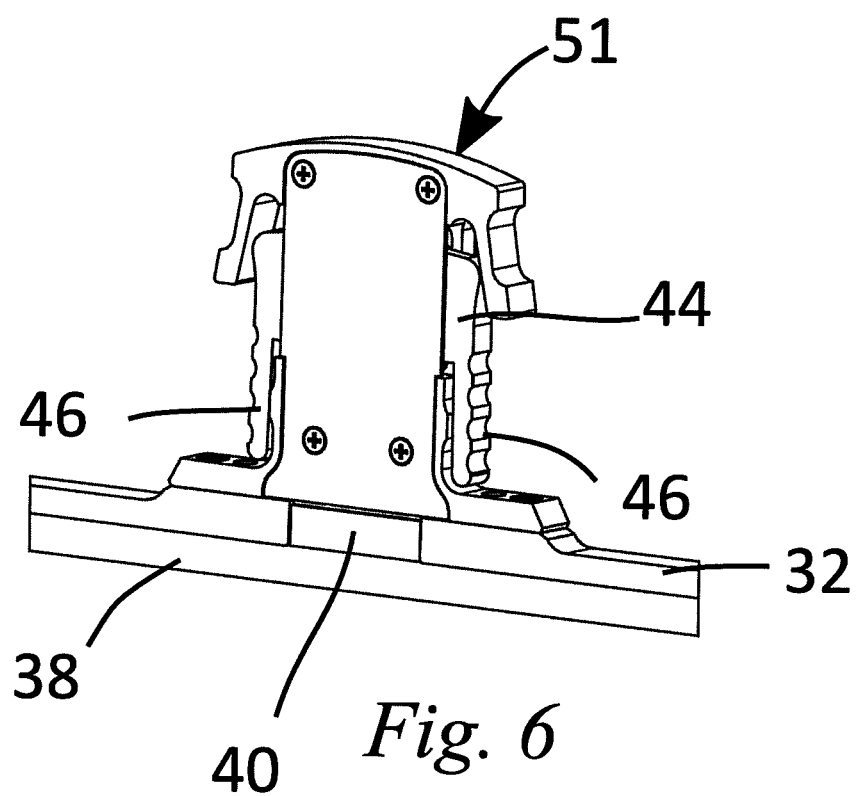
FIG. 6 is a perspective view of part of the new filter tray in a first position.

When the retainer actuator 51 is not being manipulated, the moveable wedge 40 is urged downwards, so that it retains any photographic filter that is in position. When the camera operator wishes to either remove a photographic filter present in the rectangular frame 32 or insert a photographic filter (or carry out both operations to swap photographic filters), the operator grips or pinches the two actuators 44 so that both elongate arms 46 are pressed towards the centre line of the retainer actuator 51, the force exerted by the operator being shown by arrows a in FIG. 5. This causes the actuator 44 to each rotate about their respective pivot bosses 52 as shown in FIG. 6, and the levered cam surfaces 58 to be urged inwards. As each levered cam surfaces 58 bears against an angled surface of the sliding cam follower 60, the wedge carrier body 59 is forced upwards overcoming the biased spring 42 until the levered cam surface 58 have both reached the thinnest point of the wedge carrier body 59 and the shoulders 62 abut the levered cam surface 58, and the moveable wedge 40 has been retracted from the rectangular frame 32 to the position shown in FIG. 6, allowing photographic filters to be inserted or removed from the rectangular frame 32 of the tray 30.

The retainer actuator 51 also includes a guard body 56 including two guard arms 57 which extend over the upper portions of the actuators 44. These guard arms 57 allow the filter tray 30 to be manipulated by the retainer actuator 51, in particular, when it is desired to rotate one or more filter trays 30 when fitted in the matte box, without releasing the photographic filter 38. The guard body 56 therefore prevents inadvertent release of a photographic filter 38.

In this embodiment, two actuators are shown, each arranged to pivot. This gives mechanical advantage when an operator (whose fingers may be cold, or who may be wearing gloves) grips the actuator. It will be realised though that over forms of lever, linkage, or one or more pivot points may be provided between an actuator element and the moveable wedge. Referring to FIG. 7 for example, actuators 69 each feature a slot 80 which engages with a pin 79, so that the actuators 69 are constrained to move linearly. In a similar manner to the previous example, each actuator 69 has a cam surface 75 which bears against one of two sliding cam followers 77 features on the wedge carrier body 66. This when a user pinches the two actuators 69, the wedge carrier body 66 is forced upwards overcoming the bias of the spring 67 of the guide pin 72, to withdraw the moveable wedge 65. When the pressure on the actuators 69 is removed, the wedge carrier body 66 is forced downwards by the spring 67 until shoulders 82 on the wedge carrier body 66 abut stops 83 present on the retainer body. The actuators 69 are shielded from inadvertent operation by a guard handle 70. Two actuators are convenient, though the moveable wedge could be operated by a single actuator, as shown in FIG. 8, where a single actuator 69 has a cam surface 75 which bears against a sliding cam follower 77, here the cam surface 75 being simplified to a simple inclined edge and the sliding cam follower 77 a circular post that is embossed from the surface of the wedge carrier body 66 that bears it. Two springs 67 bias the wedge carrier body 66.

Figure 9:
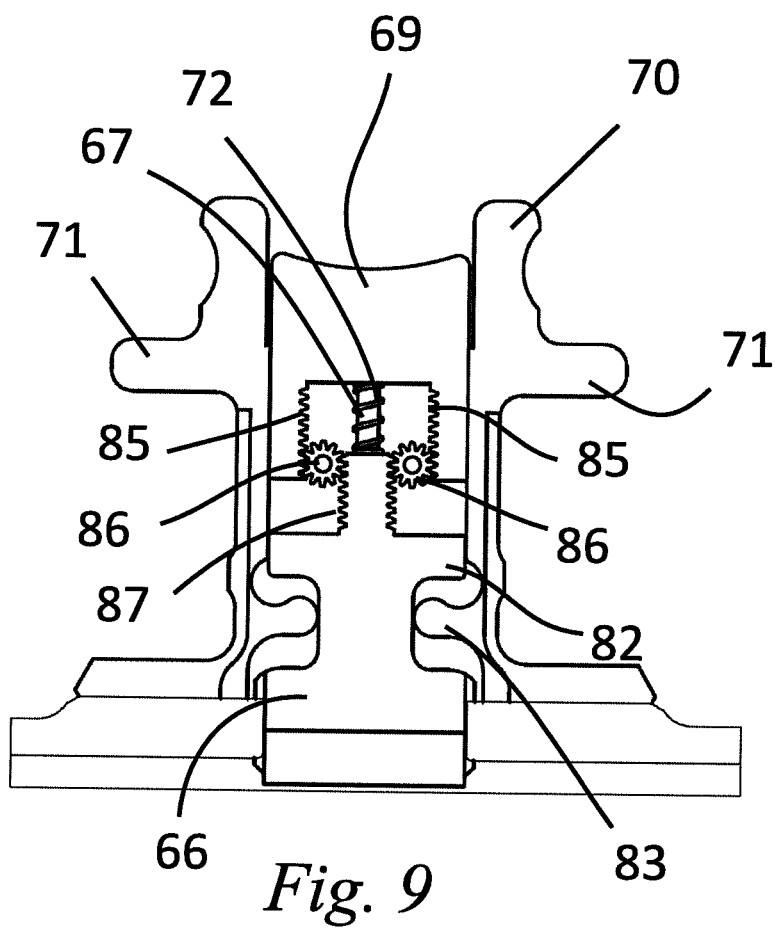
FIG. 9 is a sectional view of part of the new filter tray with an actuator having a linear reversing mechanism.

Referring to FIG. 9, the convenience of being able to operate the moveable wedge 65 by pressure may be effected by an actuator 69 that relies on a linear reversing mechanism, here implemented by two actuator ratchets 85 whose translation turn pawls 86, which in turn moves wedge ratchets 87, causing the wedge carrier body 66 to move upwards when the actuator 69 is pressed downwards. The guard handle 70 may include finger grips 71 so that the user can easily gain purchase on the actuator 69 in a similar fashion to depressing a syringe plunger.

The invention claimed is:

1. A camera matte box filter tray system, comprising:
a matte box having a filter tray space capable of receiving a plurality of filter trays;
a plurality of filter trays which may be inserted into the filter tray space so that the filter trays are aligned, and the plane of each filter tray is parallel with every other filter tray; and
at least one filter tray having a frame for holding an optical filter;
the frame of the at least one filter tray having:
an outer peripheral surface, and an inner surface,
an aperture in the frame extending from the outer surface to the inner surface of the frame,
a retaining mechanism located on one side of the frame, and
one or more protrusions on inner surface on the side of the frame opposite the retaining mechanism;
the retaining mechanism comprising:
a wedge carrier body which extends through the slot, the wedge carrier body including a wedge for retaining an optical filter,
a wedge carrier body including a cam follower distal from the wedge, and
an actuator which includes an arm, and a cam surface, which bears against the cam follower of the wedge carrier body;
the actuator being pivoted so that when the arm is pressed towards the wedge carrier body, the cam surface of the actuator urges the cam follower of the wedge carrier body upwards, and the wedge moves into the slot to allow the optical filter to be inserted or removed from the frame.

2. A filter tray according to claim 1, wherein the actuator includes a pivot point.

3. A filter tray according to claim 1, wherein the actuator includes a lever arm.

4. A filter tray according to claim 1, wherein the wedge carrier body includes two oppositely disposed cam followers distal from the wedge, and two oppositely disposed actuators are provided either side of the wedge carrier body.

5. A filter tray according to claim 1, wherein a biasing spring acts to bias the wedge carrier body downwardly.

6. A filter tray according to claim 1, wherein guard elements are included to prevent inadvertent activation of the actuator.

7. A filter tray according to claim 1, wherein the actuator, the arm of the actuator, and the cam of the actuator are formed as a unitary body, the cam of the actuator bearing directly against the cam-following surface of the wedge carrier body.

8. A filter tray according to claim 7, wherein the wedge carrier body, the cam-following surface of the wedge carrier body and the wedge are formed as a unitary body.

* * * * *